United States Patent
Laivins et al.

(10) Patent No.: US 8,820,191 B2
(45) Date of Patent: Sep. 2, 2014

(54) CENTER MOUNT HANDGUARD

(75) Inventors: Kenneth T. Laivins, Hebron, OH (US); Glen A. Laivins, Hebron, OH (US)

(73) Assignee: CV Products Consolidated LLC, Thomasville, NC (US)

(*) Notice: Subject to any disclaimer, the term of this patent is extended or adjusted under 35 U.S.C. 154(b) by 1096 days.

(21) Appl. No.: 12/167,394

(22) Filed: Jul. 3, 2008

(65) Prior Publication Data
US 2008/0264198 A1    Oct. 30, 2008

Related U.S. Application Data

(63) Continuation-in-part of application No. 11/259,793, filed on Oct. 27, 2005, now abandoned.

(51) Int. Cl.
*B62K 21/12*    (2006.01)
*B62J 23/00*    (2006.01)

(52) U.S. Cl.
CPC .............. *B62K 21/12* (2013.01); *B62K 21/125* (2013.01); *B62J 23/00* (2013.01)
USPC ..................................................... 74/551.8

(58) Field of Classification Search
CPC ........ B62J 23/00; B62K 21/12; B62K 21/125
USPC ............ 74/551.1, 551.8, 551.9; 296/92, 78.1; 280/279
See application file for complete search history.

(56) References Cited

U.S. PATENT DOCUMENTS

| | | |
|---|---|---|
| 4,141,567 A | 2/1979 | Scott |
| D319,992 S | 9/1991 | Acerbis |
| 5,832,786 A | 11/1998 | Risley |
| 6,505,877 B1 | 1/2003 | Devlin et al. |
| 6,752,447 B2 * | 6/2004 | Gagne ............................. 296/92 |
| D492,623 S | 7/2004 | DeLanghe et al. |
| 6,789,835 B2 * | 9/2004 | Wargin et al. ................ 296/78.1 |
| 6,808,219 B2 | 10/2004 | Barber et al. |
| 7,257,873 B2 | 8/2007 | Laivins et al. |
| 7,360,819 B1 * | 4/2008 | Hahne .......................... 296/78.1 |
| 2004/0173046 A1 | 9/2004 | Hancock et al. |
| 2004/0217243 A1 | 11/2004 | Laivins et al. |
| 2005/0040621 A1 * | 2/2005 | Paris et al. ..................... 280/279 |

(Continued)

FOREIGN PATENT DOCUMENTS

NL          9200652       *   4/1992  ............ B62K 21/12

OTHER PUBLICATIONS http://atvprice.com/shopping/fastway/handguards.htm, Oct. 25, 2005.

*Primary Examiner* — Vinh Luong
(74) *Attorney, Agent, or Firm* — Benesch, Friedlander, Coplan & Aronoff, LLP (57) ABSTRACT

A handguard assembly for a handlebars is provided. In one embodiment, the handguard mounting assembly includes a pair of arm members, a pair of shields, and a pair of mounting devices. In this embodiment, the mounting devices are configured to connect to an inner portion of at least one of the handlebars. Each arm member is configured to connect to one of the pair of mounting devices and is further configured to connect to an end portion of a respective handlebar. Each arm member includes an elongated front configured to extend in front of a handlebar. The elongated front includes a shield engaging portion, and a bend formed by at least an upwardly angled portion and a downwardly angled portion.

19 Claims, 11 Drawing Sheets

(56) References Cited

U.S. PATENT DOCUMENTS

| | | |
|---|---|---|
| 2007/0137409 A1 | 6/2007 | Laivins et al. |
| 2008/0141821 A1 * | 6/2008 | Degarate et al. ............. 74/551.8 |
| 2013/0205938 A1 * | 8/2013 | Hsu et al. ..................... 74/551.8 |

\* cited by examiner

CENTER MOUNT HANDGUARD

CROSS REFERENCE TO RELATED APPLICATION

This application is a continuation-in-part of U.S. application Ser. No. 11/259,793 filed on Oct. 27, 2005, which published as U.S. Application Publication No. 2007/0137409.

FIELD OF INVENTION

The present application relates to a handguard for a handlebar. In particular, the present application relates to a center mount handguard for a handlebar of a vehicle, such as a motorbike, motorcycle, motor scooter, bicycle, or all-terrain vehicle ("ATV").

BACKGROUND

Handguards for protecting the hands of riders of motorbikes, motorcycles, motor scooters, bicycles, and ATVs are known in the art. The handguard is configured to protect a rider's hands from wind, rain, and debris.

In one known embodiment, two separate handguards are configured to be mounted on a pair of handlebars. A left handguard includes a left arm member, a left shield member, and a mounting member, and is mounted to a left handlebar. A right handguard includes a right arm member, a right shield member, and a mounting member, and is mounted to a right handlebar. The left and right handguards are connected to outer portions of the handlebars.

BRIEF DESCRIPTION OF THE DRAWINGS

In the accompanying drawings, structures are illustrated that, together with the detailed description provided below, describe exemplary embodiments of the claimed invention.

In the drawings and description that follows, like elements are identified with the same reference numerals. The drawings are not to scale and the proportion of certain elements may be exaggerated for the purpose of illustration.

DETAILED DESCRIPTION

The present application is directed to a center mount handguard for a handlebar of a vehicle, such as a motorbike, a motorcycle, a motor scooter, a bicycle, or an ATV. The handguard may be employed to protect a rider's hand from wind, rain, and debris.

"Right" and "left" as used herein refer to the right and left directions as viewed from the perspective of a rider of the vehicle.

An "inner" direction as used herein refers to a direction towards the body of the vehicle.

An "outer" direction as used herein refers to a direction away from the body of the vehicle.

Figure 1:
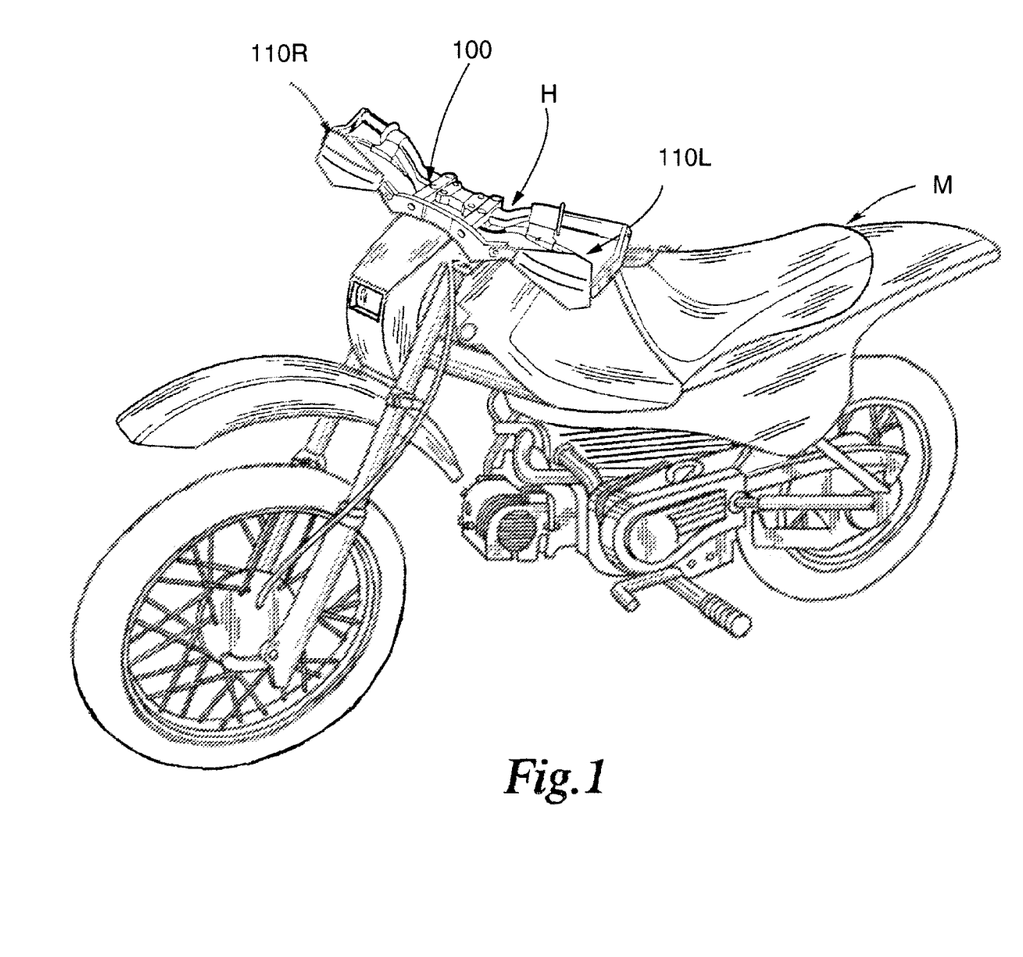
FIG. 1 is a perspective view of one embodiment of a handguard assembly with a shield disposed on a motorcycle.

FIG. 1 illustrates a perspective view of one embodiment of a handguard assembly 100, including right and left shields 110L,R, mounted on a handlebar H of a motorbike M. In this embodiment, the handguard assembly 100 is positioned in front of the handlebar H to protect a rider's hand. In alternative embodiments, the handguard assembly 100 may be employed on a motorcycle, motor scooter, bicycle, ATV, or any other vehicle having handlebars.

Each shield 110L,R may be constructed of a variety of polymeric materials, including, without limitation, polypropylene, polyethylene, ethylene propylene diene monomer (EPDM) rubber, or a combination thereof. Polypropylene provides stiffness to the shields 110L,R, while polyethylene provides resilience and EPDM rubber provides flexibility.

Since each shield 110L,R is constructed of a polymeric material, it can be molded to include complex features and to facilitate installation on a handlebar H. Furthermore, a polymeric material can flex to the shape of a handlebar H, allowing each shield 110L,R to be attached to handlebars of different shapes and sizes. Additionally, the use of a polymeric material allows each shield 110L,R to absorb impacts and retain its shape.

Figure 2:
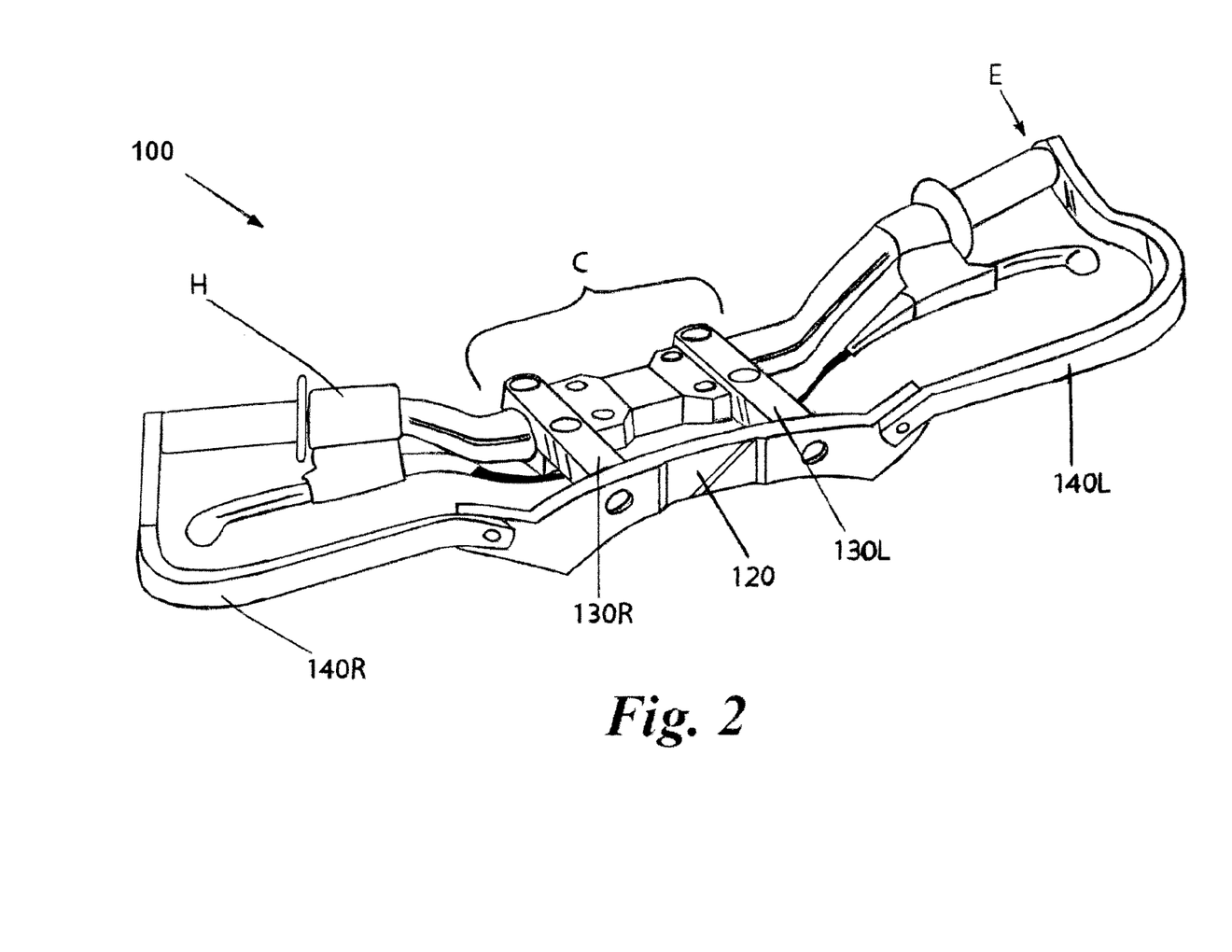
FIG. 2 is a front perspective view of one embodiment of a handguard assembly attached to a handlebar.

FIG. 2 illustrates a front perspective view of one embodiment of a handguard assembly 100 attached to a handlebar H. In this illustrated embodiment, the shields 110L,R have been removed. The handguard assembly 100 includes a central member 120, left and right mounting devices 130L,R, and left and right arm members 140L,R. As shown in the illustrated embodiment, the central member 120 is connected to the left and right mounting devices 130L,R, which are, in turn, connected to a low bend in the central section C of the handlebars H. The central member 120 is also connected to the left and right arm members 140L,R, which are in turn connected to end portions E of the left and right handlebars H, respectively.

In an alternative embodiment (not shown), the handguard assembly 100 includes a single mounting device. In another alternative embodiment (not shown), the handguard assembly 100 includes two or more left arm members and two or more right arm members.

As will be explained in further detail below, in one embodiment, each arm member 140L,R has two apertures (not shown) while each shield 110 has two corresponding apertures (not shown), such that the shields 110 may be attached to the arm members 140L,R via fasteners (not shown). In alternative embodiments (not shown), the support member and shield each have a single aperture or the support member and shield each have three or more apertures.

Figure 3:
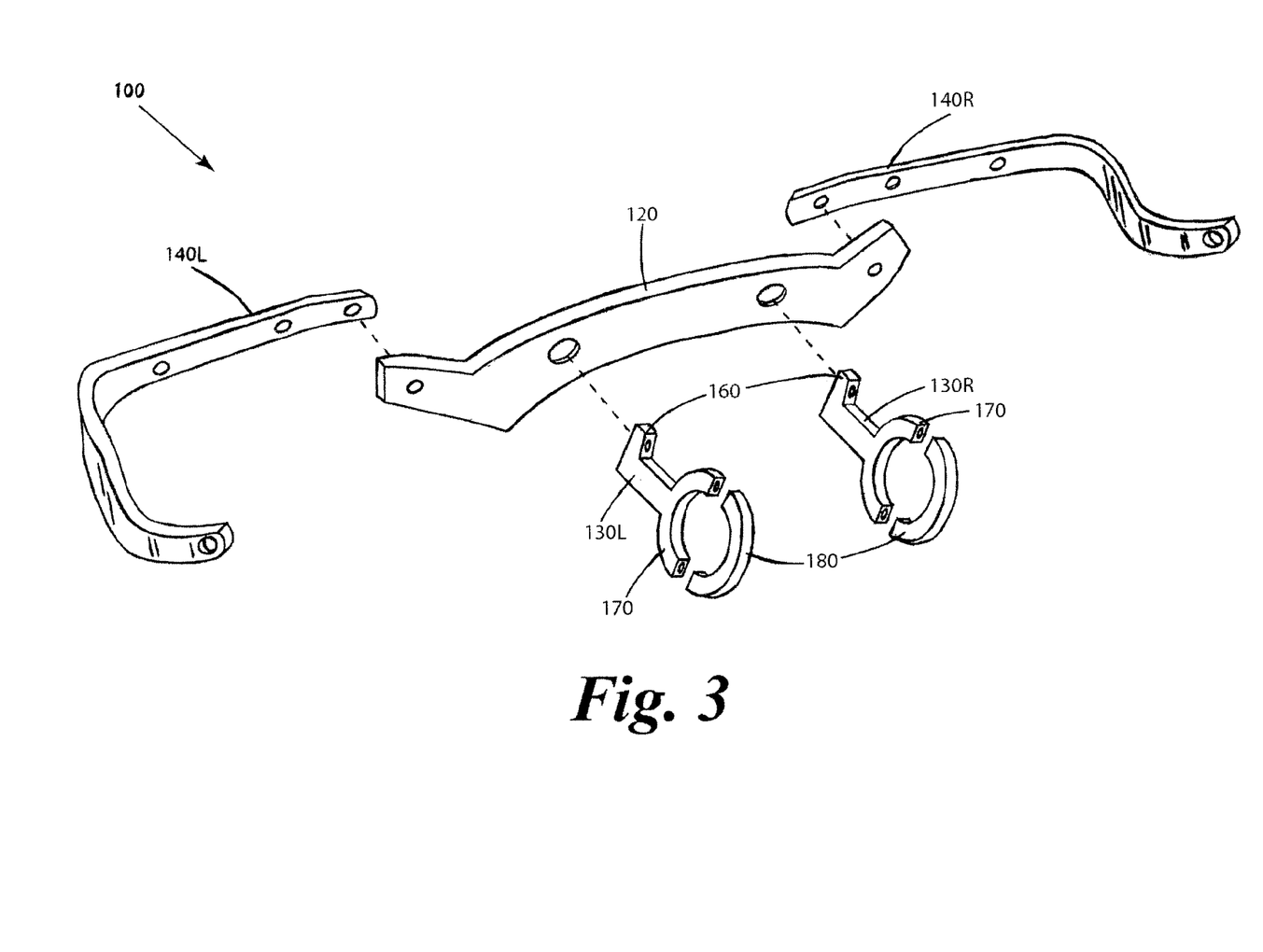
FIG. 3 is an exploded rear perspective view of one embodiment of a handguard assembly.

FIG. 3 illustrates an exploded rear perspective view of one embodiment of a handguard assembly 100. In this embodiment, the mounting devices 130L,R are elongated members having mounting flanges 160 at a front end, and C-shaped portions 170 at a back end. The C-shaped portions 170 are configured to be attached to C-shaped brackets 180.

In FIG. 3, the C-shaped portions 170 of each mounting device 130L,R are disposed in an upright configuration. In an alternative embodiment illustrated (not shown), the C-shaped portion of a mounting device is disposed horizontally. In other alternative embodiments (not shown), the C-shaped portion of a mounting device may be disposed in any orientation.

In one embodiment, the mounting devices 130L,R are constructed of metal and can be manufactured by CNC manufacturing, stamping, and forging. In another embodiment, the mounting devices 130L,R are constructed of a polymeric material. The polymeric material of the mounting devices 130L,R may be different from the polymeric material of the shield 110, to provide for different levels of strength.

Figure 4A:
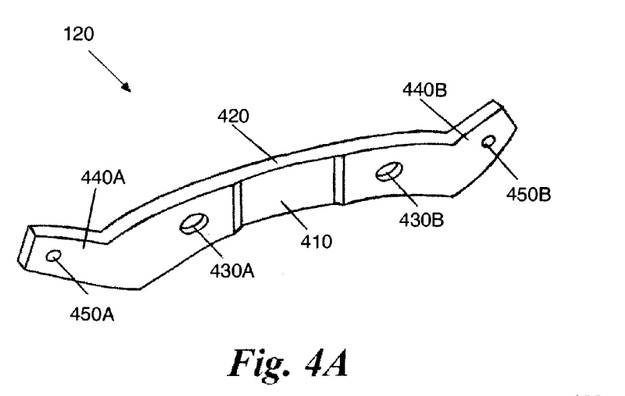
FIGS. 4A and 4B are front plan views of one embodiment of a central member in first and second orientations, respectively.

FIG. 4A illustrates a first orientation of an exemplary embodiment of a central member 120. In the illustrated embodiment, the central member 120 includes a body portion 410 having an edge 420. In the first orientation shown in FIG. 4A, the edge 420 is at the top of the body portion 410. In a second orientation, shown in FIG. 4B, the central member 120 is inverted by 180°, such that the edge 420 is at the bottom of the body portion 410. The body portion 410 further includes a pair of apertures 430A,B configured to receive fasteners (not shown). Exemplary fasteners include, without limitation, screws, bolts, ties, or any other appropriate fastening devices. As will be explained further below, in reference to FIG. 5A, the apertures 430A,B correspond with apertures in the mounting flanges 160 of the mounting devices 130L,R.

With continued reference to FIG. 4A, the central member 120 further includes a pair of wing portions 440A,B. Each wing portion 440A,B is located at an end of the body portion 410. Each wing portion has an aperture 450A,B configured to receive fasteners (not shown). Exemplary fasteners include, without limitation, screws, bolts, ties, or any other appropriate fastening devices.

In the first orientation, illustrated in FIG. 4A, the wing portions 440A,B extend above the edge 420 such that the apertures 450A,B are located above the edge 420. In the second orientation, illustrated in FIG. 4B, the wing portions 440A,B extend below the edge 420 such that the apertures 450A,B are located below the edge 420. As will be explained further below, in reference to FIG. 6, the apertures 450A,B correspond with apertures in the arm members 140L,R.

In an alternative embodiment (not shown), the central member includes an aperture configured to accommodate at least one cable, such as a brake line or a control cable.

Figure 4B:
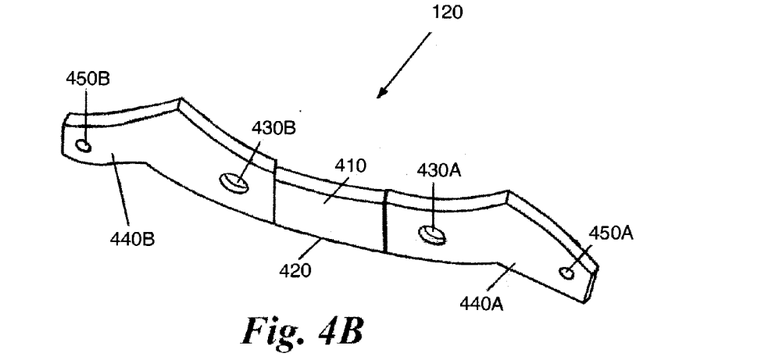
Figure 4C:
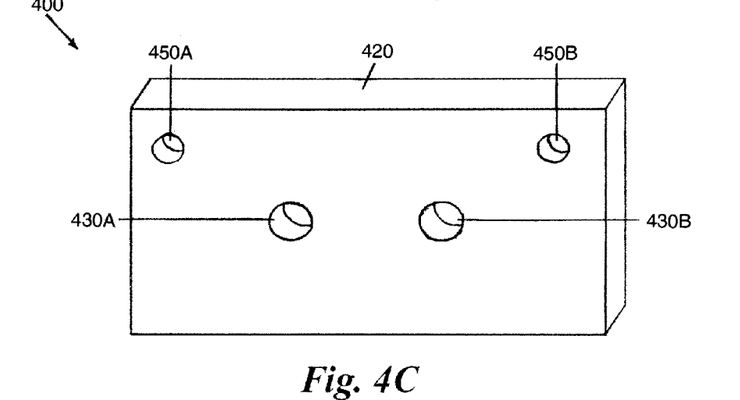
FIG. 4C is a front plan view of an alternative embodiment of a central member.

FIG. 4C illustrates an alternate embodiment of a central member 400. In this embodiment, the central member 400 is a rectangular member having a first pair of apertures 430A,B and a second pair of apertures 450A,B. In the illustrated orientation, the second pair of apertures 450A,B are located above the first pair of apertures 430A,B. In a second orientation, in which the central member 400 is inverted, the second pair of apertures 450A,B are located below the first pair of apertures 430A,B. In other alternative embodiments (not shown), the central member may be of any shape.

In one embodiment, the central member 120 is constructed of metal and can be manufactured by CNC manufacturing, stamping, and forging. In another embodiment, the central member 120 is constructed of a polymeric material. The polymeric material of the central member 120 may be different from the polymeric material of the shield 110, to provide for different levels of strength.

Figure 5A:
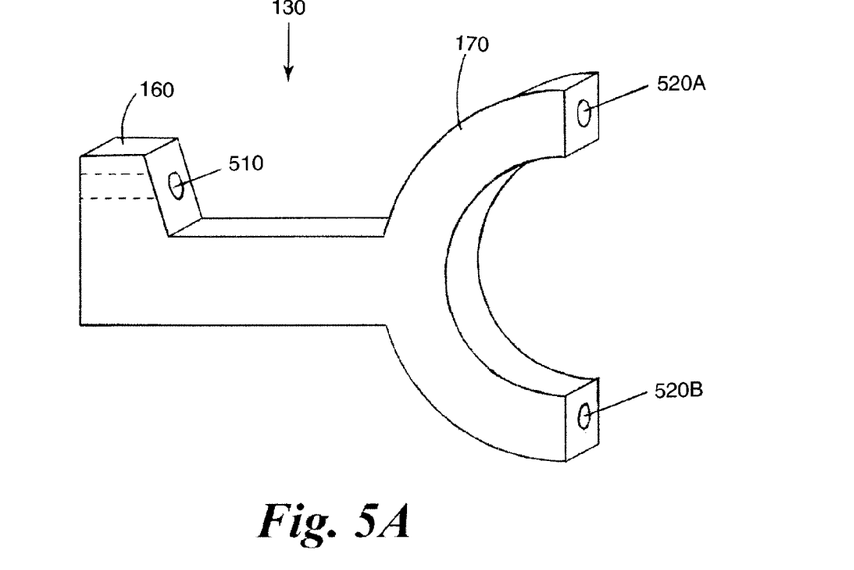
FIG. 5A is a perspective view of one embodiment of a mounting device.

FIG. 5A illustrates a perspective view of a mounting device 130. The mounting flange 160 of each mounting device 130 includes an aperture 510 corresponding to one of the apertures 430A,B in the body portion 410 of the central member 120. With reference to FIGS. 3, 4A, and 5A, a fastener (not shown) is passed through the apertures 430A,B of the body portion 410 of the central member 120 and each corresponding aperture 510 of the mounting flange 160 of each mounting device 130L,R, thereby fixing the central member 120 to the mounting devices 130L,R.

In alternative embodiments (not shown), the central member 120 and/or the mounting devices 130L,R may include substantially horizontal or substantially vertical slots instead of apertures. Slots would allow the position of the mounting devices 130L,R to be adjustable relative to the central member 120 so that the handguard assembly 100 can accommodate handlebars or various sizes and configurations. For example, a central member having substantially vertical slots would allow a rider to adjust the mounting devices to accommodate handlebars having triple mount clamps. In one embodiment, the central member has substantially horizontal slots and the mounting devices have substantially vertical slots, thus allowing a rider to adjust the mounting devices in a substantially horizontal direction relative to the handlebars, and to further adjust the central spar in a substantially vertical direction relative to the handlebars. In other embodiments (not shown) the mounting flange 160 of each mounting device 130 includes two or more apertures (not shown).

With continued reference to FIG. 5A, the C-shaped portion 170 of each mounting device 130 has a pair of apertures 520A,B configured to receive fasteners (not shown) to connect each mounting device 130 to a C-shaped bracket 180 (as shown in FIG. 3). Exemplary fasteners include, without limitation, screws, bolts, ties, or any other appropriate fastening devices. The C-shaped bracket 180 and the C-shaped portion 170 of each mounting device 130 are joined by fasteners to create a friction fit around a handlebar H. In another embodiment (not shown) the C-shaped portion 170 of each mounting device 130 includes three or more apertures (not shown). In yet another embodiment (not shown), the mounting device is a unitary mounting bracket. For example, the back end of each mounting device 130 may be an adjustable clamp that connects to the handlebar H. In an additional alternative embodiment (not shown), the left and right mounting devices may be replaced with a U-shaped mounting device.

In an alternative embodiment (not shown), each mounting device includes an aperture configured to accommodate at least one cable, such as a brake line or a control cable.

Figure 5B:
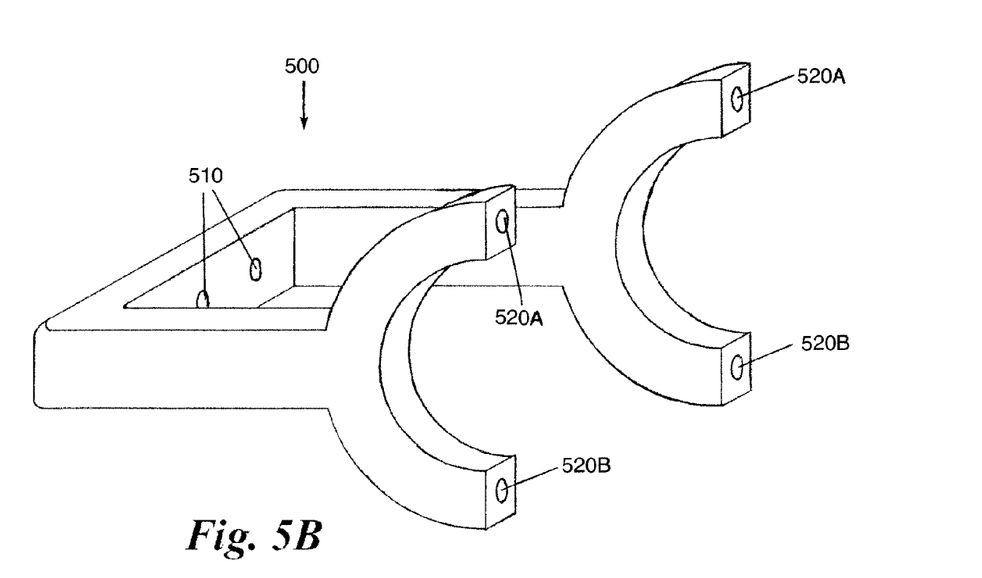
FIG. 5B is a perspective view of an alternative embodiment of a mounting device.

FIG. 5B illustrates an alternative embodiment of a single mounting device 500 that could be used in place of left and right mounting devices 130L,R. In this embodiment, the mounting device 500 is substantially U-shaped. The base of the "U" includes a pair of apertures 510 that correspond to the apertures 450A,B of the body portion of the central member 120. The remaining components of the single mounting device 500 is substantially the same as the left and right mounting devices 130L,R.

In one embodiment, the mounting devices 130L,R are constructed of metal and can be manufactured by CNC manufacturing, stamping, and forging. In another embodiment, the mounting devices 130L,R are constructed of a polymeric material. The polymeric material of the mounting devices 130L,R may be different from the polymeric material of the shield 110, to provide for different levels of strength.

Figure 6:
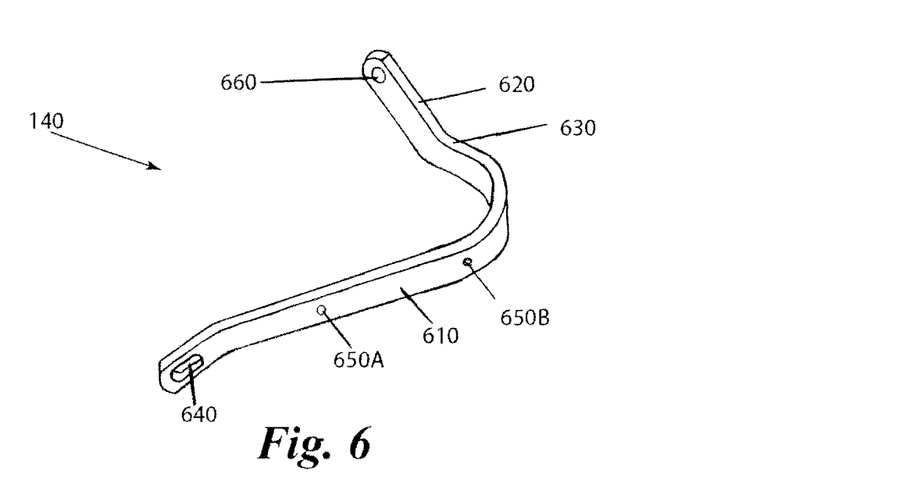
FIG. 6 is a perspective view of one embodiment of an arm member.

FIG. 6 illustrates a perspective view of an exemplary left arm member 140L. It should be understood that an exemplary right arm member has substantially the same, but complementary components. As shown in the illustrated embodiment, the arm member 140 is generally L-shaped, such that when the handguard assembly 100 is connected to a vehicle, a major segment 610 of the arm member 140 extends in front of the handlebars H and a minor segment 620 of the arm member 140 is substantially orthogonal to the handlebars H. The major segment 610 is oriented at an angle A with respect to the minor segment 620, wherein angle A is chosen such that the major segment 610 is at an optimal distance from the handlebar H. The major segment 610 should be close enough to the handlebar H to maximize protection of a rider's hands, yet far enough away from the handlebar H to allow a rider to quickly remove his hands if necessary. In one embodiment, angle A is between 70-75°. In the illustrated embodiment, angle A is approximately 71°. In an alternative embodiment (not shown), the major segment 610 is substantially perpendicular to the minor segment 620.

With continued reference to FIG. 6, the minor segment 620 of the arm member 140 includes a V-shaped bend 630, as shown. In other words, if a top view of the arm member 140 is taken to be an X-Y plane, the arm portion is bent downwards in a Z direction. In this configuration, at least a portion of the minor segment 620 extends below the handlebar H, allowing a rider to quickly remove his hand from the handlebar H if necessary. In an alternative embodiment (not shown), the minor segment of the arm member is straight.

In the illustrated embodiment, the major segment 610 includes a primary aperture 640 that corresponds to one of the apertures 450A,B of the wing portions 440A,B of the central member 120. With reference to FIGS. 3, 5A, and 6, a fastener (not shown) is passed through the apertures 450A,B of the wing portions 440A,B of the central member 120 and each corresponding primary aperture 640 of the major segment 610 of each arm member 140L,R, thereby fixing the central member 120 to the arm members 140L,R.

The major segment further includes a pair of secondary apertures 650A,B that correspond to a pair of apertures (not shown) on the shield member 110. A fastener (not shown) is passed through the apertures of the shield member 110 and the corresponding secondary apertures 650A,B of the major segment 610 of each arm member 140L,R, thereby fixing the shield members 110 to the arm members 140L,R.

With continued reference to FIG. 6, the minor segment 620 includes an aperture 660 configured to receive a fastener (not shown) to attach the minor segment 620 to a handlebar H. Exemplary fasteners include, without limitation, screws, bolts, ties, or any other appropriate fastening devices.

In one embodiment, the arm members 140L,R are constructed of metal and can be manufactured by CNC manufacturing, stamping, and forging. In an alternative embodiment, the arm members 140L,R are constructed of a polymeric material. The polymeric material of the arm members 140L,R may be different from the polymeric material of the shield 110, to provide for different levels of strength. In another alternative embodiment (not shown), the major segment of the arm members may be configured as shield portions, thus eliminating the need for separate shields.

Figure 7:
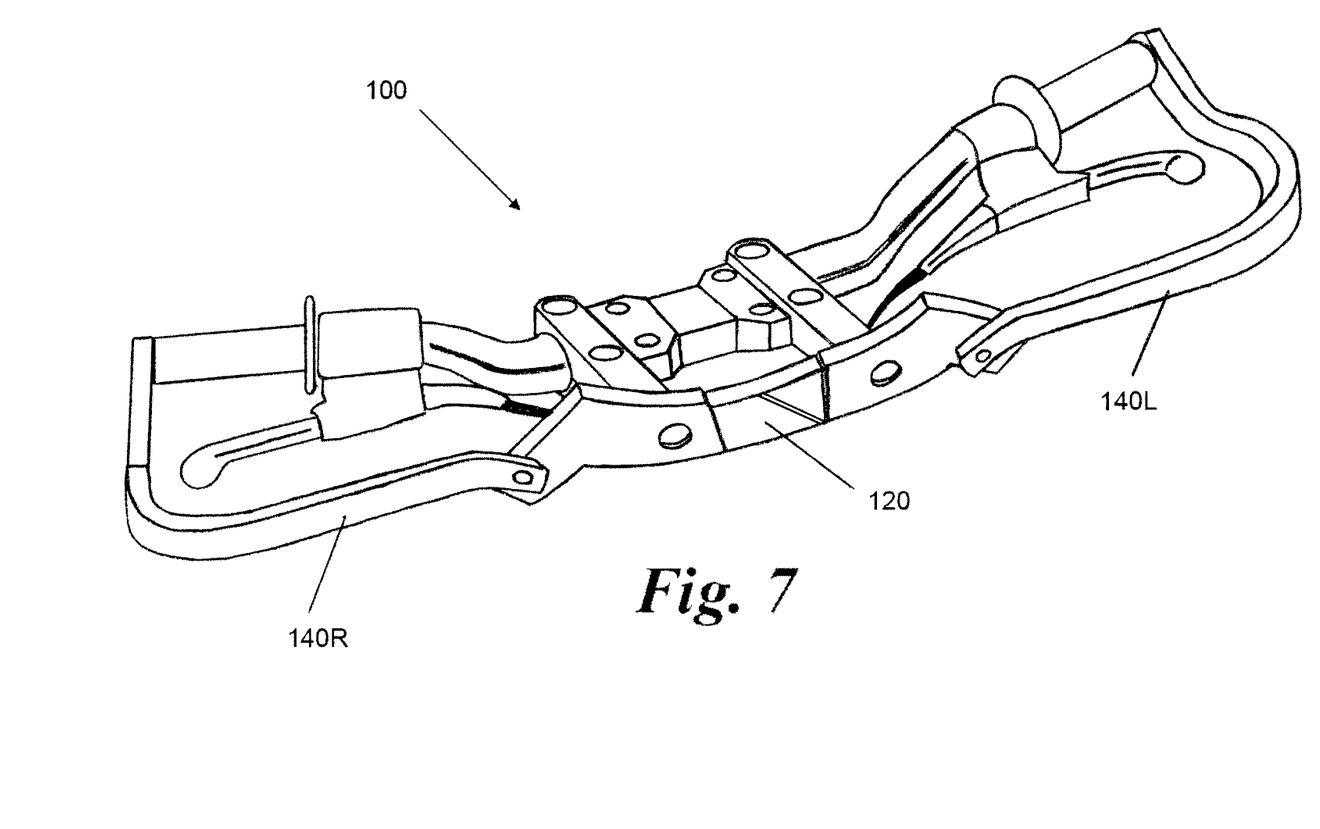
FIG. 7 is a front perspective view of one embodiment of a handguard assembly with an inverted central member.

FIG. 7 illustrates a front perspective view of one embodiment of a handguard assembly 100 with an inverted central member 120. In the illustrated embodiment, the handguard assembly 100 is assembled as described above, with reference to FIGS. 3, 4A, 5A, and 6, except that the central member 120 is placed in the second orientation, as shown in FIG. 4B. When the handguard assembly is assembled in this fashion, the left and right arm members 140L,R are connected to the central member 120 at a lower position, and thus the left and right shields 110L,R are also in a lower position. In this manner, a rider may attach the handguard assembly 100 to handlebars H of a vehicle at a position of his preference.

Figure 8:
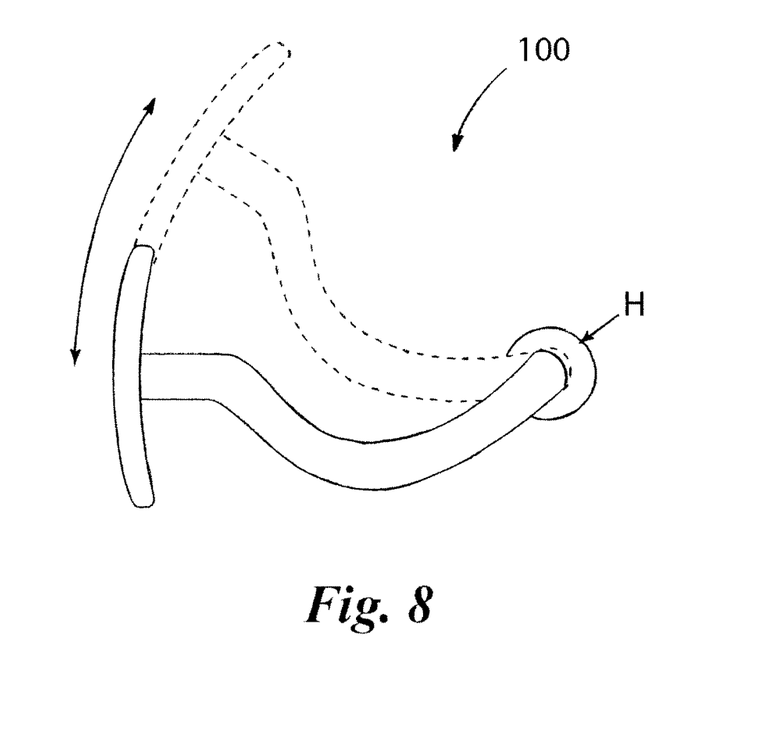
FIG. 8 is a side view of one embodiment of the handguard assembly in different positions relative to a handlebar.

FIG. 8 illustrates a side plan view of a handguard assembly 100 connected to a handlebar H according to another embodiment of the present application. In this embodiment, after the handguard assembly 100 has been mounted to the handlebars H of a vehicle, the rider may pivotally adjust the handguard assembly 100 about the handlebars H to a preferred position. The fastener (not shown) that passes through the aperture 660 of the minor segment 620 of each arm member 140 forms a friction fit inside a cavity (not shown) of the handlebar H, such that the fastener may be pivoted if appropriate pressure is applied to the handguard assembly 100. Likewise, the mounting devices 130L,R form a friction fit with the lower bend of the handlebars H, such that the mounting devices 130L,R may be pivoted if appropriate pressure is applied to the handguard assembly 100.

Figure 9:
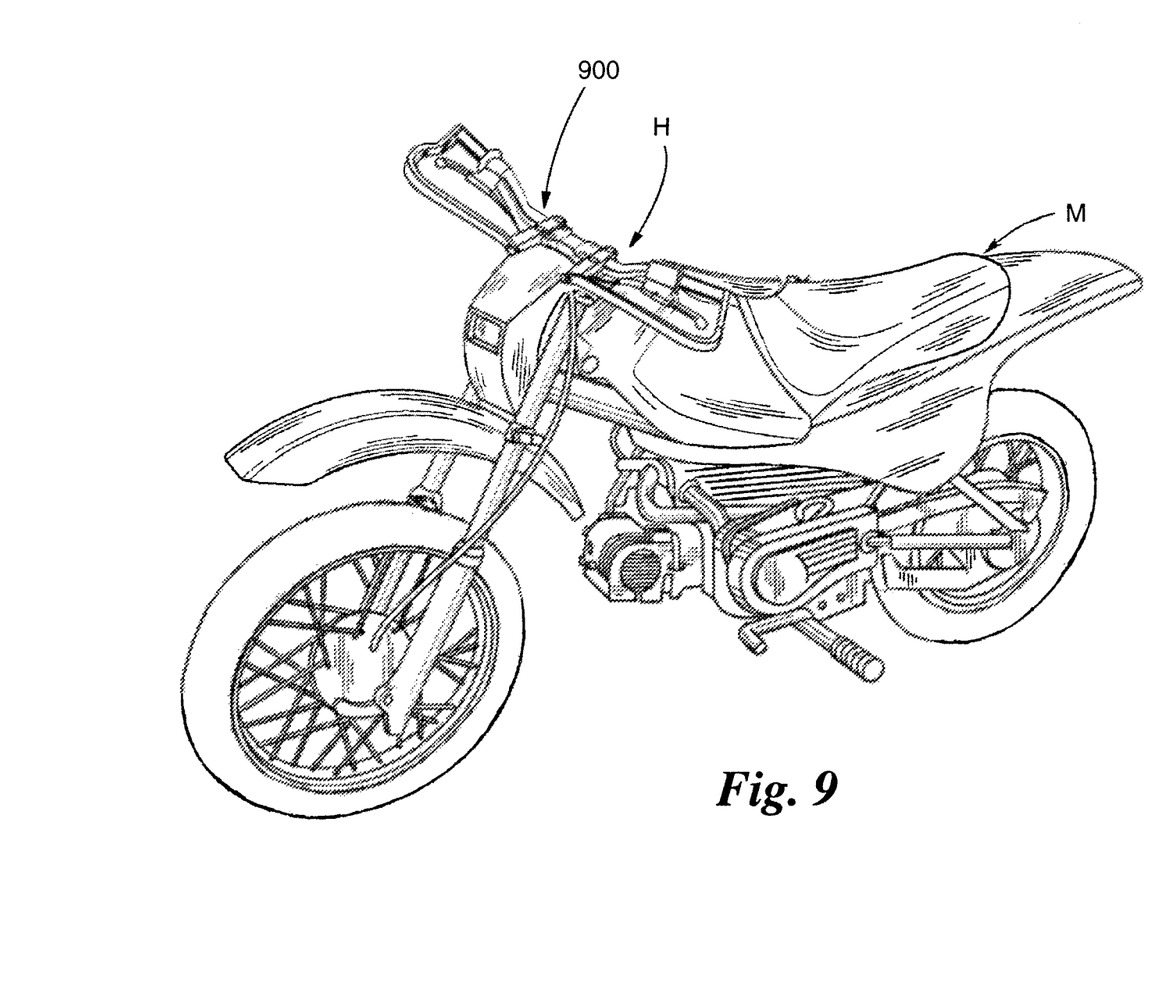
FIG. 9 is a perspective view of an alternative embodiment of a handguard assembly disposed on a motorcycle.

FIG. 9 illustrates a perspective view of an alternative embodiment of a handguard assembly 900 mounted on a handlebar H of a motorbike M. For illustrative purposes, right and left shields have been removed from the handguard assembly 900. It should be understood that appropriate shields, such as those described above with respect to the first embodiment of a handguard assembly 100, may be employed. In this embodiment, the handguard assembly 900 is positioned in front of the handlebar H to protect a rider's hand. In alternative embodiments, the handguard assembly 900 may be employed on a motorcycle, motor scooter, bicycle, ATV, or any other vehicle having handlebars.

Figure 10:
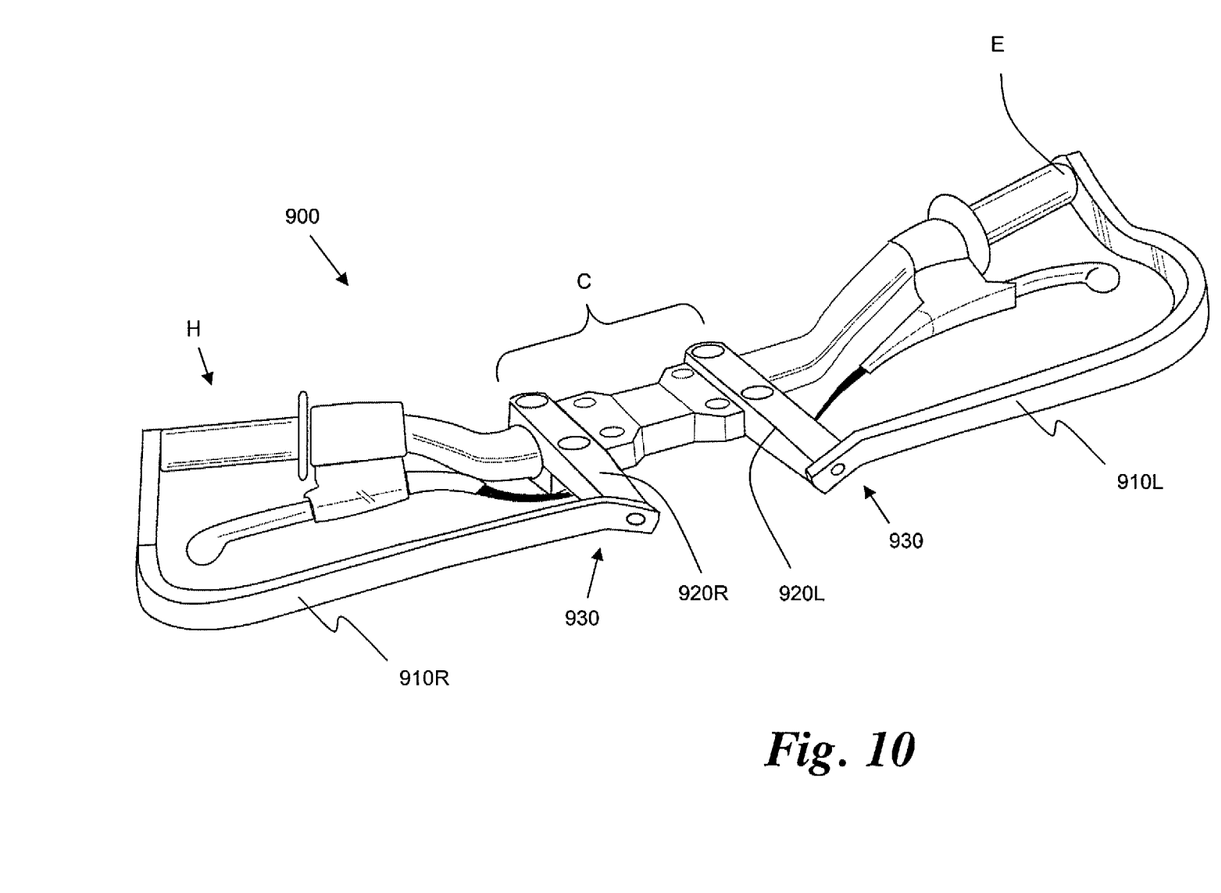
FIG. 10 is a front perspective view of an alternative embodiment of a handguard assembly attached to a handlebar.

FIG. 10 illustrates a front perspective view of an alternative embodiment of a handguard assembly 900 (with shields removed) attached to a handlebar H. The handguard assembly 900 is substantially similar to the handguard assembly 100, except it does not include a central member. Instead, the handguard assembly 900 includes elongated left and right arm members 910L,R connected to left and right mounting devices 920L,R. Each arm member is substantially L-shaped and includes a minor segment configured to extend substantially orthogonally from a handlebar and a major segment configured to extend in front of a handlebar. The minor segment of the arm may be referred to as the forward extension. The major segment may be referred to as the elongated front.

As shown in the illustrated embodiment, the left and right mounting devices 920L,R are connected to a low bend in the central section C of the handlebars H. In an alternative embodiment, the left and right mounting devices 920L,R are connected to a central spar of the motorbike M. The left and right arm members 910L,R each include a bend 930 to provide clearance for at least one cable, such as a brake line or a control cable. The left and right arm members 910L,R are also connected to end portions E of the left and right handlebars H, respectively.

In an alternative embodiment (not shown), the handguard assembly 900 includes two or more left arm members and two or more right arm members.

Figure 11:
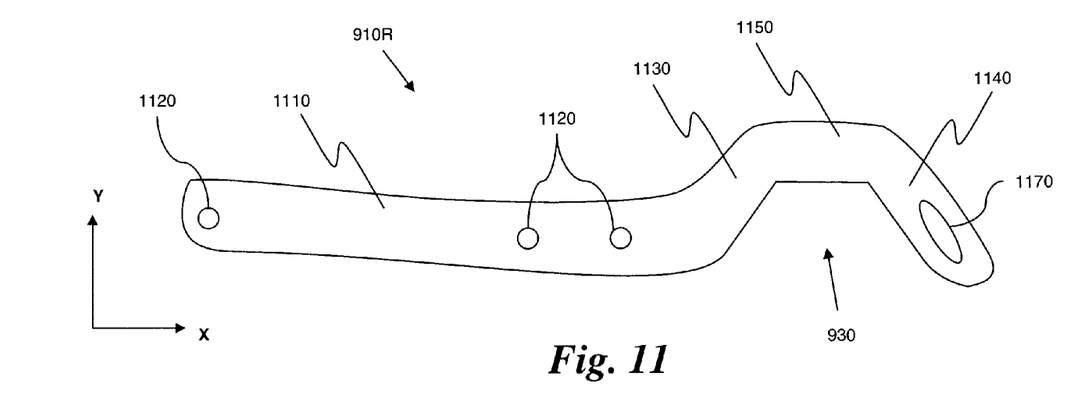
FIG. 11 is a front view of one embodiment of an arm member for an alternative embodiment of a handguard assembly.

FIG. 11 illustrates a front view of a right arm member 910R. It should be understood that the left arm member 910L has a corresponding shape. In the illustrated embodiment, the right arm member 910R includes an elongated front having an elongated shield engaging portion 1110 configured to engage a shield (not shown). The shield engaging portion 1110 includes a plurality of apertures 1120. In the illustrated embodiment, the shield engaging portion 1110 has three apertures 1120 while each shield (not shown) has three corresponding apertures, such that the shield may be attached to the shield engaging portion 1110 via fasteners (not shown). In an alternative embodiment (not shown), the shield engaging portion 1110 and the shield each have two or fewer apertures. In another alternative embodiment (not shown), the shield engaging portion 1110 and the shield each have four or more apertures.

With continued reference to FIG. 11, the elongated front of the right arm member 910R further includes an upwardly angled portion 1130 and a downwardly angled portion 1140. The upwardly angled portion 1130 and downwardly angled portion 1140 may also be referred to as converging portions. In the illustrated embodiment, the right arm member 910R also includes a raised portion 1150 connecting the upwardly angled portion 1130 and downwardly angled portion 1140. Together, the upwardly angled portion 1130, downwardly angled portion 1140, and raised portion 1150 form the bend 930 that provides clearance for cables, wherein the bend 930 is a substantially "U-shaped" bend. In the illustrated embodiment, the raised portion 1150 is substantially horizontal. In an alternative embodiment (not shown), the raised portion may be angled. In another alternative embodiment (not shown), the arm member may include a plurality of upwardly angled portions and downwardly angled portions.

In the illustrated embodiment, the right arm member 910R further includes a slot 1170 configured to receive a fastener to connect the arm member to a mounting device, as described below. In the illustrated embodiment, the slot 1170 is employed to allow a user to adjust the position of the arm 910R with respect to the mounting device so that the user may position the handguard as desired. In an alternative embodiment (not shown), a circular aperture is employed instead of a slot.

In one embodiment, the elongated front of each arm member is between about 12 inches to about 18 inches in length, and the raised portion of the arm member is between about 3 inches to about 6 inches in length and is at an elevation of about 1 inch to about 4 inches above the remainder of the elongated front of the arm. Further, in one embodiment, the forward extension of each arm member is between about 4 inches to about 8 inches in length. In one particular embodiment, the elongated front of each arm member is about 14 inches in length and the raised portion is about 5 inches and at an elevation of about 4.5 inches above the remainder of the elongated front of the arm. Further, in this embodiment, the forward extension of each arm member is about 6 inches in length.

In other words, the elongated front of each arm member is about 1.25 to about 4.5 times the length of the forward extension. In one embodiment, the elongated front of each arm member is about 2 to 3 times the length of the forward extension. Further, the raised portion of the arm is about one-sixth to about one-half of the total length of the elongated front of the arm. In one embodiment, the raised portion of the arm is about one-third to about two-fifths of the total length of the elongated front of the arm.

Figure 12:
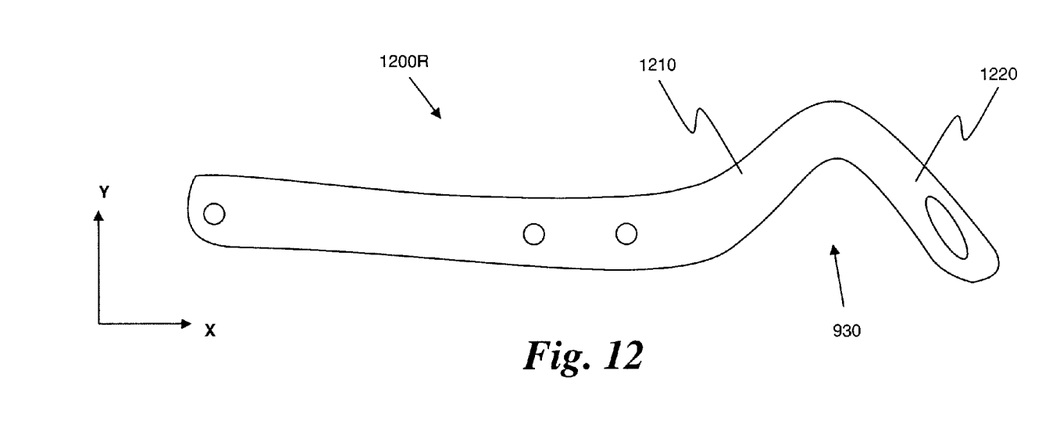
FIG. 12 is a front view of an alternative embodiment of an arm member for an alternative embodiment of a handguard assembly.

FIG. 12 illustrates another alternative embodiment of a right arm member 1200R. The illustrated embodiment is substantially the same as right arm member 910R shown in FIG. 11, except the arm member does not include a raised portion. Instead an upwardly angled portion 1210 and a downwardly angled portion 1220 form a bend 930 that is a substantially "V-shaped" bend. It should be understood that an alternative embodiment of a left arm member (not shown) has a corresponding shape. It should be further understood that the alternative embodiment of the right arm member 1200R and the corresponding alternative embodiment of the left arm member may be employed in place of the left and right arm members 910L,R shown in FIG. 9.

Figure 13:
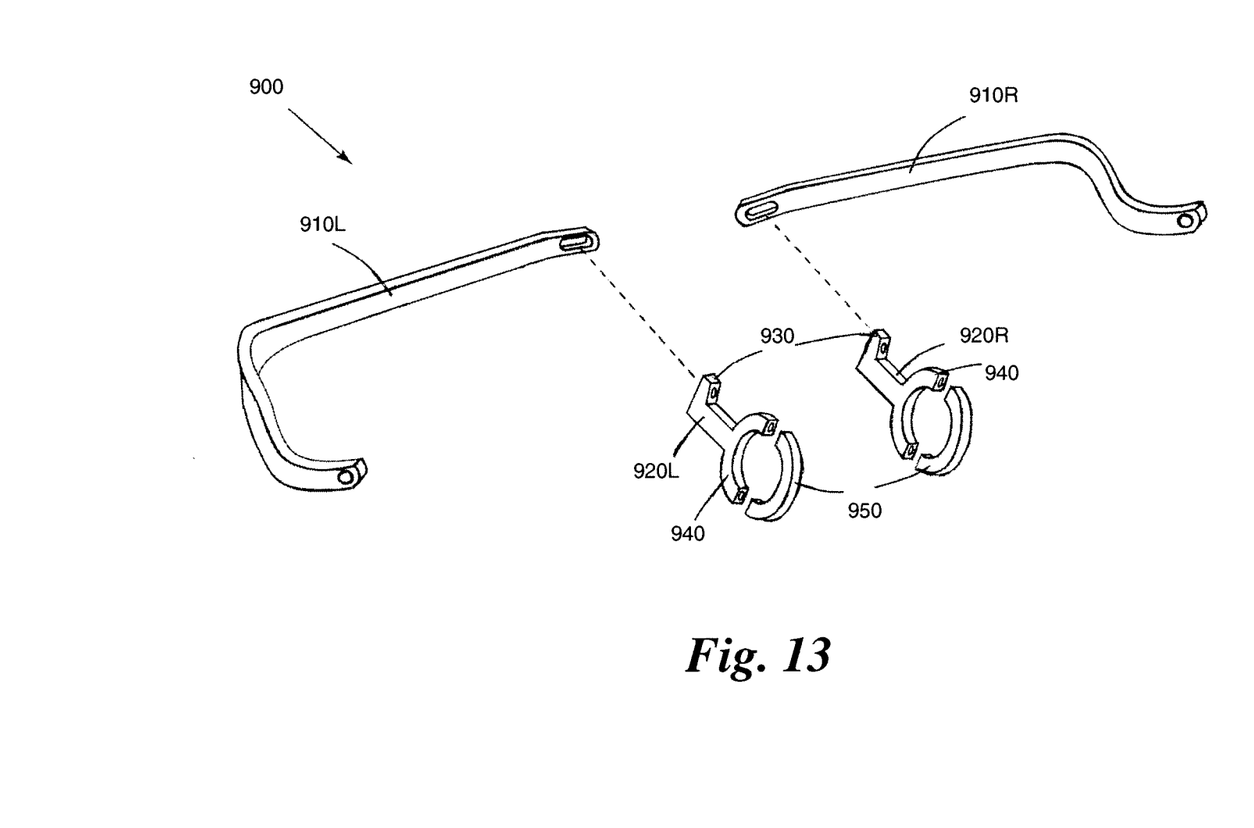
FIG. 13 is an exploded rear perspective view of an alternative embodiment of a handguard assembly.

FIG. 13 illustrates an exploded back perspective view of an alternative embodiment of a handguard assembly 900. In this embodiment, the mounting devices 920L,R are elongated members having mounting flanges 930 at a front end, and C-shaped portions 940 at a back end. The C-shaped portions 940 are configured to be attached to C-shaped brackets 950.

In FIG. 13, the C-shaped portions 940 of each mounting device 930L,R are disposed in an upright configuration. In an alternative embodiment illustrated (not shown), the C-shaped portion of a mounting device is disposed horizontally. In other alternative embodiments (not shown), the C-shaped portion of a mounting device may be disposed in any orientation.

In one embodiment, the mounting devices 920L,R are constructed of metal and can be manufactured by CNC manufacturing, stamping, and forging. In another embodiment, the mounting devices 920L,R are constructed of a polymeric material. The polymeric material of the mounting devices 920L,R may be different from the polymeric material of the shield, to provide for different levels of strength.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

What is claimed is:

1. A handguard assembly for a pair of handlebars, the handguard assembly comprising:
   a pair of arm members;
   a pair of shields; and
   a pair of mounting devices configured to connect to an inner portion of at least one of the pair of handlebars, wherein
   each arm member is configured to connect to one of the pair of mounting devices and is further configured to connect to an end portion of one of the pair of handlebars, and wherein
   each arm member includes an elongated front configured to extend in front of one of the pair of handlebars, the elongated front including a shield engaging portion, and a bend formed by at least an upwardly angled portion and a downwardly angled portion; and
   wherein the elongated front of each arm member further includes a raised portion connecting the upwardly angled portion and the downwardly angled portion.

2. The handguard assembly of claim 1, wherein the bend formed by the upwardly angled portion and the downwardly angled portion is a substantially V-shaped bend.

3. The handguard assembly of claim, wherein the bend formed by at least the upwardly angled portion and the downwardly angled portion is formed by the upwardly angled portion, the downwardly angled portion, and the raised portion is a substantially U-shaped bend.

4. The handguard assembly of claim 1, wherein each arm member includes at least two components.

5. The handguard assembly of claim 1, wherein each arm member includes a slot configured to receive a fastener to adjustably connect the arm member to one of the pair of mounting devices.

6. The handguard assembly of claim 1, wherein each of the pair of mounting devices is configured to be adjusted in at least a substantially horizontal direction relative to the pair of handlebars.

7. The handguard assembly of claim 1, wherein the handguard assembly is pivotally adjustable with respect to the pair of handlebars.

8. The handguard assembly of claim 1, wherein the elongated front of each of the pair of arm members includes a plurality of apertures configured to receive a plurality of fasteners to engage one of the pair of shields.

9. A handguard assembly configured to be attached to a pair of handlebars of a vehicle, the handguard assembly comprising:
 at least one mounting member configured to connect to an inner portion of one of the pair of handlebars; and
 at least one arm member configured to connect to the at least one mounting member and to an end portion of one of the pair of handlebars, wherein the at least one arm member includes an elongated front having an upwardly angled portion, a downwardly angled portion, and a raised portion that form a substantially U-shaped bend.

10. The handguard assembly of claim 9, wherein each of the at least one arm member is generally L-shaped, having a minor segment configured to extend substantially perpendicularly from an end of one of the pair of handlebars in a forward direction and a major segment configured to extend in front of one of the pair of handlebars.

11. The handguard assembly of claim 9, wherein the downwardly angled portion of the at least one arm member has a slot configured to receive a fastener to adjustably connect to one of the at least one mounting members.

12. The handguard assembly of claim 9, wherein the elongated front of each of the at least one arm member includes a plurality of apertures configured to receive a plurality of fasteners.

13. The handguard assembly of claim 12, further including at least one shield.

14. The handguard assembly of claim 13, wherein each of the at least one shield includes a plurality of apertures corresponding to the plurality of apertures in the elongated front of each of the at least one arm member.

15. The handguard assembly of claim 9, wherein the at least one arm member and the at least one mounting member are constructed of metal.

16. A handguard assembly comprising:
 at least one mounting device configured to connect to a central spar of a vehicle; and
 at least one arm member, wherein
  the at least one arm member includes a forward extension configured to connect to an end portion of a handlebar,
  the at least one arm member further includes an elongated front configured to extend in front of the handlebar and connect to the at least one mounting device, the elongated front including a raised portion.

17. The handguard assembly of claim 16, wherein the elongated front of the at least one arm member has a total length, and the raised portion has a length of about one-third to about two-fifths of the total length of the elongated front.

18. The handguard assembly of claim 16, wherein the forward extension of the at least one arm member has a length and the elongated front of the at least one arm member has a total length, wherein the total length of the elongated front of the at least one arm member is about 2 to 3 times the length of the forward extension.

19. The handguard assembly of claim 16, wherein the vehicle is selected from the group consisting of a motorbike, a motorcycle, a motor scooter, a bicycle, and an all-terrain vehicle.

* * * * *